United States Patent [19]

Houle et al.

[11] Patent Number: 5,215,268
[45] Date of Patent: Jun. 1, 1993

[54] BAFFLE SYSTEM FOR FEED GRINDERS

[75] Inventors: Mario Houle; Ghislain St-Onge, both of Wickham, Canada

[73] Assignee: Agrimétal Inc., Wickham, Canada

[21] Appl. No.: 856,102

[22] Filed: Mar. 23, 1992

[51] Int. Cl.$^5$ .............................................. A01F 29/00
[52] U.S. Cl. ................................ 241/186.4; 241/189.1
[58] Field of Search ............... 241/186.4, 186.2, 101.7, 241/224, 225

[56] References Cited

U.S. PATENT DOCUMENTS

| | | | |
|---|---|---|---|
| 3,743,191 | 7/1973 | Anderson | 241/73 |
| 3,861,601 | 1/1975 | Kaelin | 241/186.4 X |
| 3,912,175 | 10/1975 | Anderson | 241/73 |
| 4,003,502 | 1/1977 | Barcell | 241/224 X |
| 4,773,601 | 9/1988 | Urich et al. | 241/186.4 X |

FOREIGN PATENT DOCUMENTS 121751 10/1984 European Pat. Off. ......... 241/186.4

Primary Examiner—Douglas D. Watts
Assistant Examiner—Clark F. Dexter
Attorney, Agent, or Firm—Robic

[57] ABSTRACT

A tub for grinding livestock feed on a rotary cutter. The tub has a rotating circular sidewall and two spaced apart, inwardly facing, deflecting baffles that are pivotably mounted to the sidewall and pivoted in unison by an arcuate arm spring-biased to the sidewall. The arm may slide from a first position in which it can be held by a stop, to a second position upon release of the stop. When the arm is in first position, the baffles are held along the inner wall so as to free the center of the tub for top-loading livestock feed. Upon release of the stop, the arm is biased toward the second position where the baffles extend toward the center of the tub following the contour of the livestock diminishing in size as it is shredded by the rotary cutter. The baffles may have a spring-biased swingable lower portion that swings backward upon encountering obstacles in the tub.

6 Claims, 4 Drawing Sheets 5,215,268

BAFFLE SYSTEM FOR FEED GRINDERS

BACKGROUND OF THE INVENTION a) Field of the invention

The present invention relates to a tub for grinding material on a rotary cutter. More particularly, the invention relates to an improved baffle system for such a tub.

b) Description of the prior art

Feed for livestock such as hay and the like are generally harvested into compact bales so that they are easier to transport and store. The compactness of such bales makes it not only difficult to mix the materials with grains or other types of feed but makes it also more difficult for the livestock to eat. Accordingly, various devices have been developed for grinding the baled feed so as to shred it into sizes more easily eatable by the livestock. Such devices frequently have a rotating tub-like container having a bottom floor under which is positioned a rotating rotary cutter to shred the feed. With such a device, the sidewalls of the container are rotated so as to drive the feed over the rotary cutter. Dry materials will feed through the opening of the rotary cutter reasonably well whereas damp materials and tightly compacted materials will often produce bridging over the opening and block entry of the materials into the rotary cutter.

A partial solution to this problem has been achieved by providing extension plates to the inside of the container sidewalls so as to augment feeding and/or breakup the bridging over the opening. However, because these plates are fixedly secured inside the sidewalls, they must be either placed permanently whether they are needed or not, or, put in place only when they are required which may cause installation problems when the tub is full. This problem has been addressed in U.S. Pat. No. 4,003,502 by providing selectably positionable blades attached to move with the sidewalls but extendable into or out of the container. However, because these blades are operated manually, there is a need for an operator to stay next to the grinder as the feed is shredded inside in order to push forward the blades as the load diminishes in size.

Also, because these blades advance radially in and out of the tub, the blocking of the rotation of one blade by a bridging effect may cause blocking of the whole rotating sidewall, hence causing damage either to the power means driving the walls or to the blade itself. Such a blocked blade may not be easy to retrieve by an operator without shutting off the machine.

Thus, there is a need for a grinding tub where the inner positionable blades automatically follow the contour of the feed as it diminishes in size. There is also a need for an inner blade to be resilient so that it does not block the rotation of the sidewall upon abutting against feed bridged over the rotary cutter opening.

SUMMARY OF THE INVENTION

The invention is concerned with an improvement to a tub for grinding material on the rotary cutter, this tub comprising a generally horizontal stationary bottom having an opening in which is mounted a rotary cutter, a circular sidewall, and means for deflecting radially inwardly the material when the sidewall is rotated so as to cause it to intersect the rotary cutter, the deflecting means comprising at least two spaced apart, deflecting baffles pivotably mounted onto the sidewall.

The improvement that is provided in accordance with the invention, comprises an arcuate arm linked to the baffles in such a manner as to cause them to pivot in unison between a first position where the baffles are held flat along the inner sidewall, and a second position where the baffles extend radially inwardly within the tub. The improvement also comprises means for permanently biasing the arm from the first to the second positions and securing means to retain the arm in first position whenever desired against the action of the biasing means.

In this manner, the baffles can force the material toward the rotary cutter upon release of the securing means under the action of the biasing means.

More particularly, the deflecting baffles may comprise a swingable lower portion spring-biased in vertical position. This lower portion may swing from an original vertical position to a backward position upon encountering obstacles in the tub.

DETAILED DESCRIPTION OF A PREFERRED EMBODIMENT

Figure 1:
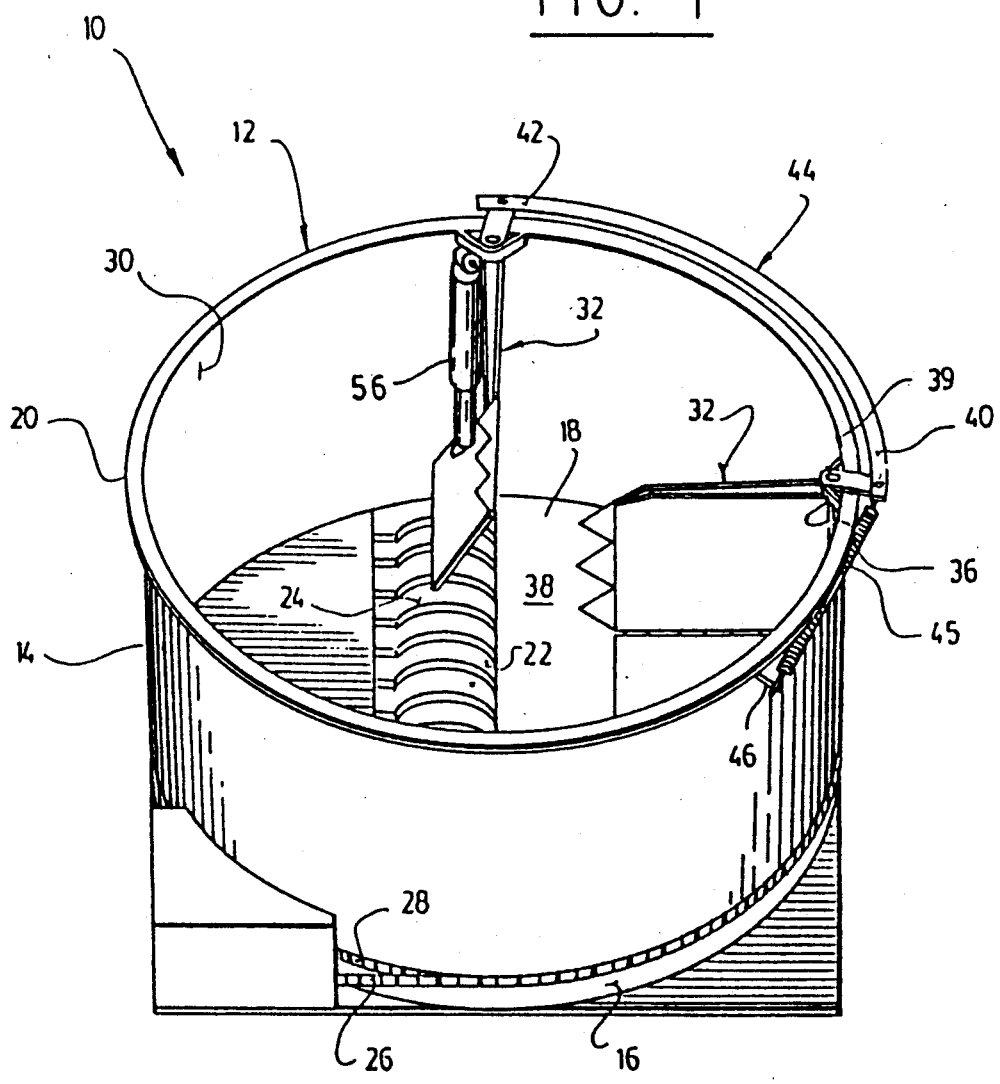
FIG. 1 is a perspective view of a feed grinder embodying the improvement of the invention.

FIG. 1 shows a mobile livestock feed tub grinder 10 embodying one example of the improvement according to the invention. The grinder 10 comprises a generally tub-shaped container 12 having a circular sidewall 14. The container is closed at its lower end 16 by a generally horizontal bottom wall 18. The top end 20 of the tub 12 is open so that it can be top-loaded with material such as livestock feed to be shredded. The bottom wall 18 of the tub 12 is provided with an opening 22 in which is mounted a rotary cutter 24. The material is ground or shredded by the rotary cutter 24 upon encountering the opening 22 while rotating, as it is driven in rotation by the rotation of the sidewall 14. Usually, as is well known in the art, the sidewall is driven in rotation by a chain 26 that is wrapped around the lower periphery of the sidewall 16 and nested with teeth 28 provided therein. The chain 26 is actuated by a motor (not shown).

Preferably, round bales are top loaded inside the tub 12 so that rotation is facilitated. However, as may be predicted, as the bale diminishes in size after a portion of it has been shredded, it is no longer in close contact with the inner sidewall 30 of the tub 12 and therefore stays immobile or stops rotating. To overcome this drawback, the inner sidewall 30 of the tub is provided with at least two deflecting baffles 32 each having a vertical hinge shaft 34, each shaft being pivotably held to the inner sidewall 30 by two V-shaped hinge brackets 36. These baffles 32 may pivot about their hinges from a position where they extend radially toward the center of the tub 38 and another position where they lay along the inner sidewall 30.

The upper end of the vertical hinge shaft 34 is linked by a short lever 39 to one end 40 or 42 of an arcuate arm 44 that is positioned adjacent the upper periphery 20 of the tub and is shaped to follow the periphery of this tub. Of course, the arcuate arm 44 may also be directly connected to the baffles 32 instead of being connected indirectly via the hinge shaft 34 and lever 39.

The arm 44 is spring-biased, one and preferably both of its ends 40 and 42 being connected by a spring 45 to a distant point on the outer sidewall 46. It is not necessary in practice that the arm 44 be connected to a spring 45 by each of its ends 40 and 42. A single spring 45 or a hydraulic cylinder could indeed be connected near the center of the arm 44 to a distant point on the outer sidewall 46. As a matter of fact, the only important feature is that the arm is linked to both baffles (or all baffles) in such a manner as to cause said baffles to move in unison from the first to the second position, and vice versa.

Figure 2:
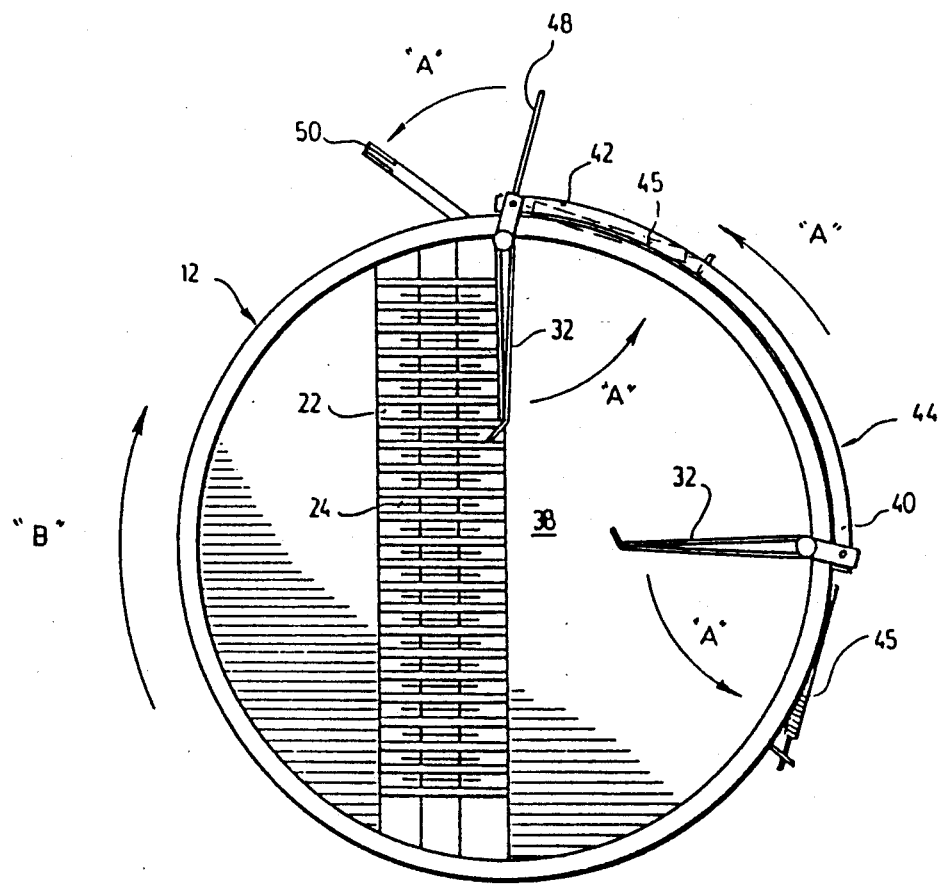
FIG. 2 is a top plan view of the feed grinder shown in FIG. 1.
Figure 3A:
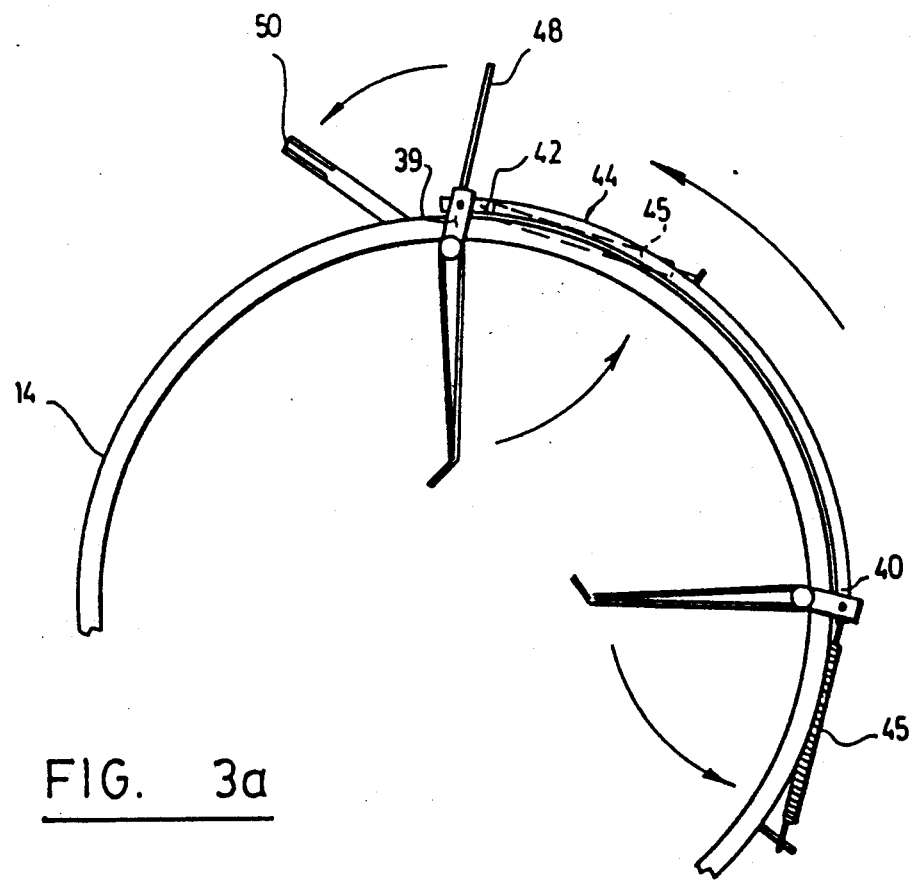
FIG. 3a is a detailed top plan view of the arcuate arm controlling the baffles of the feed grinder according to the invention in its second position.
Figure 3B:
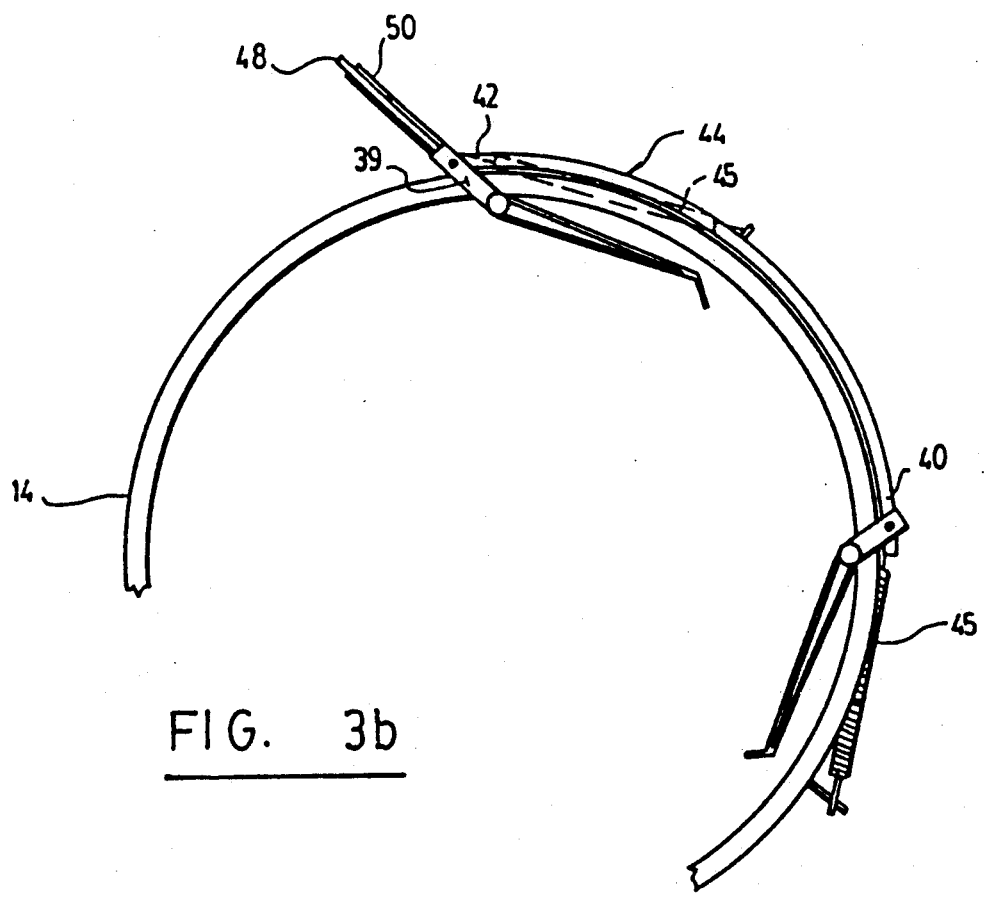
FIG. 3b is a detailed top plan view similar to FIG. 3a, showing the arcuate arm in its first position.
Figure 7:
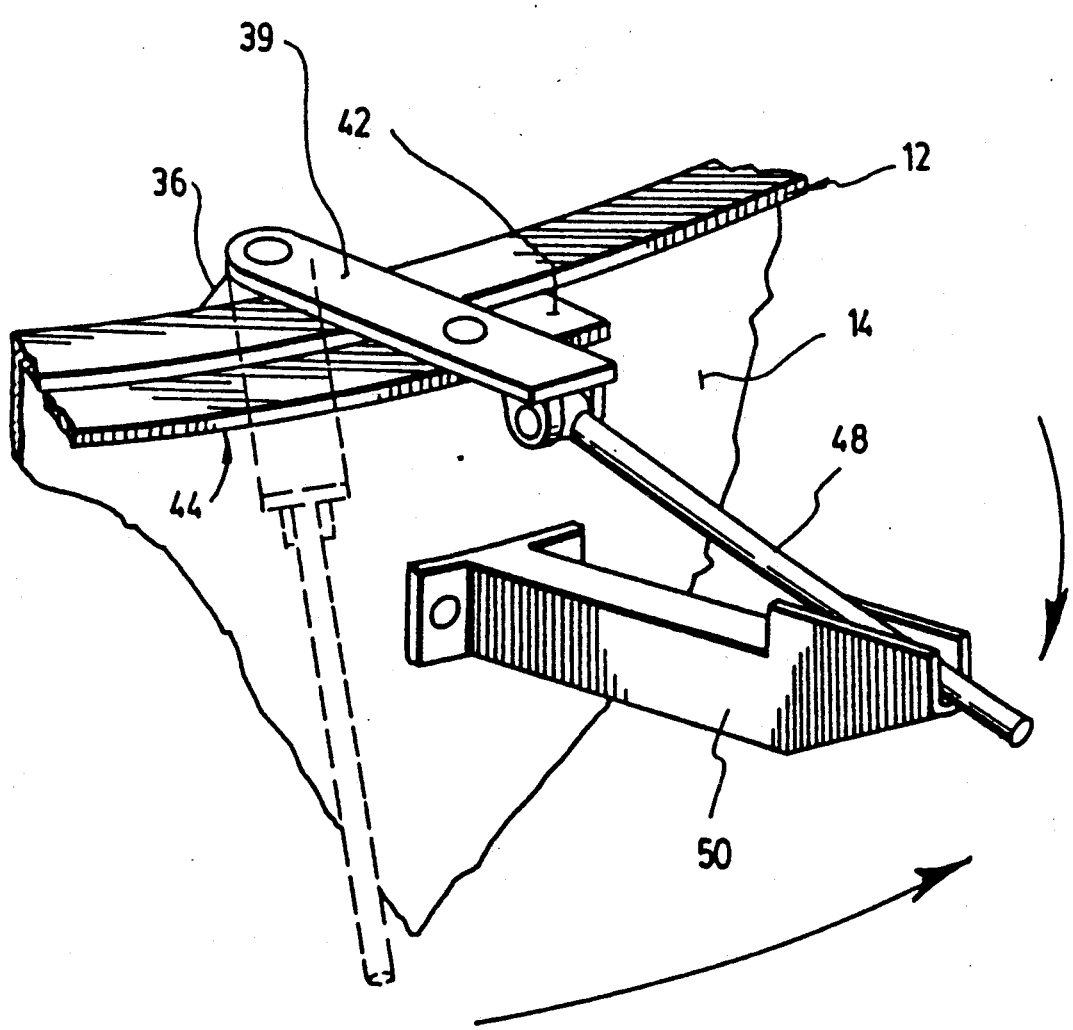
FIG. 7 is a detailed perspective view of the locking mechanism shown in FIGS. 2, 3a and 3b.

As better shown on FIGS. 2, 3a and 3b, the arcuate arm 44 follows the outer periphery of the tub 12 for approximately a quarter of its circumference, and links the two baffles 32 to each other by its two ends 40 and 42, via the short levers 39. In the relaxed position of FIGS. 2 and 3a the baffles 32 extend more or less toward the center of the tub 38 and are approximately at 90° angle from the ends 40 and 42. The arm 44 can slide around this contour to a certain extent, thereby driving the baffles 32 in unison to a first position (arrow A) where they are held along the inner wall 30 as shown in FIG. 3b.

Figure 6:
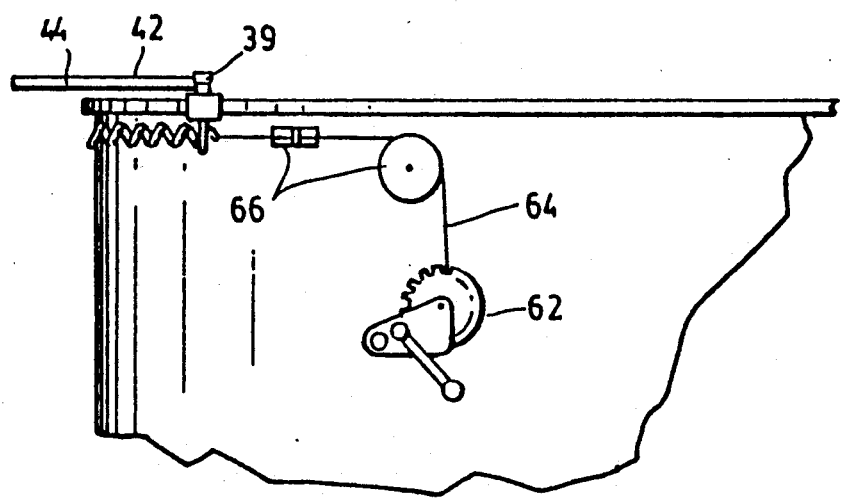
FIG. 6 appearing on the same sheet of drawings as FIG. 1, is a partial side elevational view of the tub of the feed grinder of FIG. 1, showing another mechanism for placing and retaining the arcuate arm controlling the baffles in their first position.

As is shown in FIGS. 2, 3a and 3b, the arm 44 may be pulled manually by means of a pulling lever 48 that is a longitudinal extension of one of the short levers 39. This lever 48 may be pulled down and engaged into a slot 50 that acts as a stop, thus retaining the springs 45 in extended position and the arm 44 in first position. Alternatively, as is shown in FIG. 6, the arm 44 may be pulled by means of a winch 62 fixed to the external side of the tube and on which a pulling rope 64 passing over a set of grinding pulleys 66 may be wound. The winch comprises a stop that is used to lock it when the arm is in its first position. When the arm 44 and the baffles 32 are in this first position, the center of the tub 38 is free to be top-loaded with a charge of material such as one or more round bales. The stop is then released by disengaging the lever 48 from the slot 50 or releasing the winch 62, thereby allowing the baffles 32 to press against the sides of the bale(s) because they are pulled toward the center of the tub 38 by the action of the springs 45. As will be understood, when the rotary cutter 24 is activated, the material is slowly shredded and gradually diminishes in size. As the bale diminishes in size, the baffles are gradually forcing the material toward the center of the tub 38 so as to encounter the opening 22 and engage in the rotary cutter 24 until the bale is completely shredded and the baffles rest in second position radially extending toward the center of tub 38.

Figure 4:
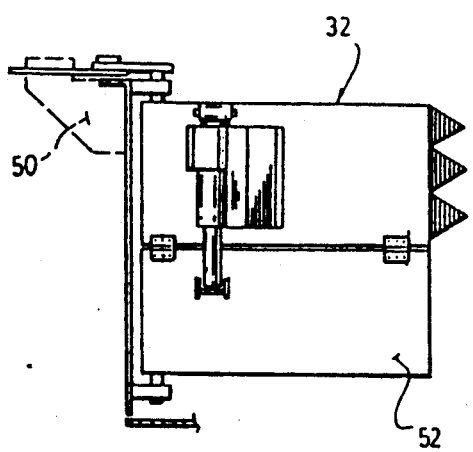
FIG. 4 appearing on the same sheet of drawings as FIG. 2, is a detailed side elevational view of one of the baffles of the feed grinder according to the invention.
Figure 5:
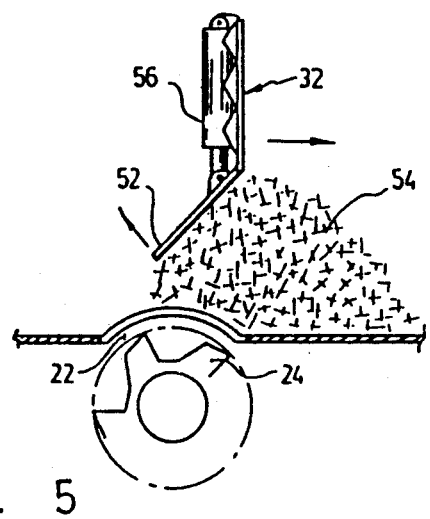
FIG. 5 appearing on the same sheet of drawings as FIG. 2, is a detailed front elevational view of the baffle of the feed grinder according to the invention, shown without its cylinder protecting deflector when it encounters an obstacle.

As some materials may produce bridging over the opening 22 and block entry of the material into the rotary cutter 24, a further improvement is provided in accordance with the invention, in order to prevent blocking of the rotation of the sidewall 14 as the baffles 32 encounter this bridge. As shown in FIGS. 4 and 5, each of the baffles 32 is provided with a lower portion 52 that is pivotably mounted about hinges 53 (see FIGS. 4 and 5) so as to swing from an original vertical position to a backward position as it is forced to do so by the presence of immobile material 54. The lower portion 52 is spring-biased in vertical position by at least one hydraulic cylinder 56 protected by small deflector 57, which pushes this lower portion 52 back to its original vertical position after it has passed the obstruction. Of course, other means such as, for example, a compression spring could be provided to bias the lower portion back to its original position.

As will be obvious for such a person, the number of baffles and their position may also vary depending on the size of the tub, the load of material and the intended use of the grinder.

What is claimed is:

1. A tub for feeding material to be ground into a rotary cutter, said tub comprising a generally horizontal stationary bottom having an opening in which the rotary cutter is mounted; a circular sidewall; means to rotate said side wall and means for deflecting radially inwardly said material when said sidewall is rotated so as to cause said material to intersect said rotary cutter, said deflecting means comprising at least two spaced apart, deflecting baffles pivotally mounted onto said sidewall, wherein said tube also comprises:

an arcuate arm linked to said baffles in such a manner as to cause said baffles to pivot in unison between a first arm position where said baffles are held along said inner sidewall and a second arm position where said baffles extend radially inwardly within said tub;

means for permanently biasing said arm from said first to said second arm positions, said biasing means comprising at least one spring connecting one point of said arm to a distant point of said sidewall; and securing means to retain said arm in said first arm position whenever desired against the action of the biasing means, whereby said baffles can force said material toward said rotary cutter upon release of said securing means under the action of said biasing means; and wherein each of said deflecting baffles comprises a swingable lower portion spring-biased in vertical position, said portion being swingable from an original vertical position to an inclined position upon encountering obstacles in said tub.

2. A tub according to claim 1, wherein said baffle lower portion is spring-biased by at least one hydraulic cylinder.

3. A tub a according to claim 2, wherein said securing means comprise a pulling lever for manually pulling said arcuate arm to said first arm position where said baffles are held along said inner sidewall, said pulling lever being engageable in a stop for securing said arm and baffles in said first arm position, said stop being disengageable when said tub is full of material so that said arm and baffles may return gradually to said second arm position upon reduction of quantity of material in said tub.

4. A tub according to claim 2, wherein said securing means comprise a winch fixed to the tub and on which a pulling rope attached to eh arcuate arm is wound to pull said arcuate arm to said first arm position, said winch having a stop that can be used to lock it when said arm is in said first arm position, said stop being disengageable when said tub is full of material to cause said arm and baffles may return gradually to said second arm position upon reduction of quantity of material in said tub.

5. A tub according to claim 1, wherein said securing means comprise a pulling lever for manually pulling said arcuate arm to said first arm position where said baffles are held along said inner sidewall, said pulling lever being engageable in a stop for securing said arm and baffles in said first arm position, said stop being disengageable when said tub is full of material so that said arm and baffles may return gradually to said second arm position upon reduction of quantity of material in said tub.

6. A tub according to claim 1, wherein said securing means comprise a winch fixed to the tub and on which a pulling rope attached to the arcuate arm is wound to pull said arcuate arm to said first arm position, said winch having a stop that can be used to lock it when said arm is in said first arm position, said stop being disengageable when said tube is full of material to cause said arm and baffles to return gradually to said second arm position upon reduction of quantity of material in said tub.

* * * * *